United States Patent [19]
Pruden et al.

[11] Patent Number: 6,077,040
[45] Date of Patent: Jun. 20, 2000

[54] CONTROL SYSTEM FOR BLADES FOR A VARIABLE PITCH PROPELLER

[75] Inventors: Robert W. Pruden, Enfield, Conn.; Paul A. Carvalho, Westfield, Mass.

[73] Assignee: United Technologies Corporation, Windsor Locks, Conn.

[21] Appl. No.: 09/071,839

[22] Filed: May 1, 1998

[51] Int. Cl.[7] .................................................. B64C 11/38
[52] U.S. Cl. .......................... 416/45; 416/157 R; 416/36; 416/45; 416/46; 416/50; 416/52; 416/61; 416/153; 416/154; 416/167
[58] Field of Search .................................. 416/31, 36, 45, 416/46, 48, 49, 50, 51, 52, 53, 61, 153, 154, 157 R, 167, 168 R

[56] References Cited

U.S. PATENT DOCUMENTS

| | | | |
|---|---|---|---|
| 4,563,940 | 1/1986 | Wuhrer | 92/106 |
| 4,901,746 | 2/1990 | Metcalf | 137/48 |
| 5,141,399 | 8/1992 | Duchesneau et al. | 416/157 R |
| 5,174,718 | 12/1992 | Lampeter et al. | 416/48 |
| 5,186,608 | 2/1993 | Bagge | 416/37 |
| 5,487,645 | 1/1996 | Eccles | 416/51 |
| 5,865,599 | 2/1999 | Pruden et al. | 416/61 |
| 5,897,293 | 4/1999 | Arel et al. | 416/46 |

*Primary Examiner*—Edward K. Look
*Assistant Examiner*—Matthew T. Shanley

[57] ABSTRACT

A system for controlling propeller blade pitch is disclosed. The system comprises a transfer tube, wherein the transfer tube defines an element of the rotatable portion and wherein the transfer tube is non-translating relative the rotatable and non-rotatable portions. A transfer bearing for providing hydraulic fluid to and interfacing with the transfer tube is also used, wherein the transfer bearing is located on the non-rotatable portion. The system further includes a pitch change actuator and a mechanism form for actuating the pitch change actuator, wherein the mechanism is fluidically connected to and translatable relative to the transfer tube. A device for measuring blade angle of the propeller blade is also provided, wherein the device is separate and distinct from the transfer tube.

29 Claims, 4 Drawing Sheets

CONTROL SYSTEM FOR BLADES FOR A VARIABLE PITCH PROPELLER

TECHNICAL FIELD

This invention is directed to propeller pitch control systems, and more particularly, to improvements in the transfer tubes, secondary pitch lock and overspeed governor mechanisms.

BACKGROUND ART

Variable pitch propeller systems typically incorporate a plurality of propeller blades mounted to a rotary hub which is driven by the aircraft engine. Each propeller blade extends radially outwardly from the hub along a longitudinal axis of the blade. In order to permit pitch adjustment, each blade is mounted to the hub for pivotable movement about its longitudinal axis. The hub typically encloses a chamber within its interior wherein a pitch change actuation system is disposed in operative association with the propeller blades. The actuation system functions to selectively change the pitch of the blades thereby altering air resistance to the rotation of the blades to control engine speed.

In most modern aircraft, the pitch change actuator is of the hydromechanical type wherein an output member, typically a piston, is driven in response to adjustments in the pressure of hydraulic fluid which drives the actuator. Adjustments in fluid pressure are typically affected by either a hydromechanical or electronic control system which monitors engine speed and causes, by an associated apparatus, a change in fluid pressure whenever the monitored engine speed departs from the desired engine speed setting.

Typical propeller systems also include a plurality of rotating parts and a plurality of stationary parts, wherein the stationary parts generally include the control elements of the system. Accordingly, an electronic engine control (EEC) and a protection valve are usually provided on the non-rotational portion of the system wherein the protection valve under control by the EEC ports hydraulic fluid to the pitch actuation assembly through a transfer bearing. In typical prior art systems, translating transfer tubes are used to direct the hydraulic fluid from the transfer bearing to the pitch actuation mechanism. Accordingly, and as shown in FIG. 4, current propeller systems provide access to the actuation systems through the centerline of the propeller shaft via the translating transfer tubes. The translating transfer tubes extend from the front of the actuator to the fwd portion of the control unit. The translating transfer tubes are connected to a piston/yoke assembly, whereby the yoke engages a cam at the base of the propeller blade and the piston assembly is translated via the porting of hydraulic fluid from the translating transfer tube to the increase pitch and a decrease pitch side thereof.

As shown in the FIG. 4, by monitoring the movement of the translating transfer tube, the pitch angle of the propeller blades can be determined via a blade angle feedback mechanism. If a minimum blade angle is detected, a secondary low pitch solenoid can be actuated for preventing further movement of the propeller blades towards lower pitch, thereby preventing dangerous excursions toward low pitch while the aircraft is in flight. As is known in the art, operation at high power and low pitch angle conditions could result in severe engine and propeller overspeed conditions and certain in-flight emergency conditions.

In addition to the secondary low pitch stop, most systems also include an overspeed governor which senses the speed of the aircraft propellers and upon sensing overspeed, also functions to prevent further pitch change towards low pitch. The overspeed governor, blade angle feedback mechanism and secondary low pressure stop of the prior art systems are typically located on the non-rotating, control portion of the propeller systems.

One disadvantage of prior art systems arises during disassembly of the control portion of the propeller actuator, which typically requires removal of the transfer tube assembly and spinner. Since the male portion of the oil transfer bearing is integral with the end of the transfer tube, handling of the transfer tube by mechanics and the like may and often does result is damage to the bearing surface. Damaged bearing surfaces can ultimately result in bearing seizure.

Further, the axial location of the translating transfer tube must be rigged properly at installation in order to set the secondary low pitch stop blade angle and provide blade angle feedback, as these functions are critical to control the aircraft. In current systems, the transfer tube is classified as a flight safety part because failure in performance thereof with regard to these two functions could compromise the safe operation of aircraft. Accordingly, the current design relies too heavily on the flight mechanic to install the transfer tube correctly to ensure that the propeller control functions as intended.

There exists a need therefor, for a simplified design of the elements of the pitch change actuation mechanism of current propeller systems, including the use of a non-translating transfer tube, and a secondary low pitch stop and overspeed governor which are separate in function and in structure from the transfer tube and which are located on the rotating portion of the propeller for simplifying their design and implementation.

DISCLOSURE OF THE INVENTION

The primary object of this invention is to provide an improved and simplified propeller blade pitch control mechanism for use with counterweighted propeller blades.

Another object of this invention is to provide an improved propeller blade pitch actuation assembly which includes the use of non-translating transfer tubes and a blade angle feedback mechanism which is separate and distinct from the translating tubes.

And still another object of this invention is to provide an improved propeller blade pitch change mechanism which incorporates the use of a purely mechanical secondary low pitch stop mechanism located on the rotating portion of the propeller assembly.

And yet another object of this invention is to provide an improved propeller pitch change and actuation assembly including a purely mechanical overspeed governor positioned on the rotating portion of the propeller assembly, and which works in conjunction with the actuation mechanism.

Still another object of this invention is to provide an improved propeller pitch change and actuation assembly having mechanical overspeed governor and secondary low pitch stop mechanisms which work in conjunction with a shared valve and the actuator mechanism for preventing low pitch excursions beyond a minimum setting and for preventing blade overspeed.

The foregoing objects and following advantages are achieved by the propeller blade pitch control system of the present invention, for use with a propeller having a non-rotatable portion and a rotatable portion while in operation.

The system comprises a transfer tube, wherein the transfer tube defines an element of the rotatable portion and wherein the transfer tube is non-translating relative the rotatable and non-rotatable portions. A transfer bearing for providing hydraulic fluid to and interfacing with the transfer tube is also used, wherein the transfer bearing sleeve is located on the non-rotatable portion.

The system further includes a pitch change actuator and a mechanism form for actuating the pitch change actuator, wherein the mechanism is fluidically connected to and translatable relative to the transfer tube. A device for measuring blade angle of the propeller blade is also provided, wherein the device is separate and distinct from the transfer tube.

BEST MODE FOR CARRYING OUT THE INVENTION

Figure 1:
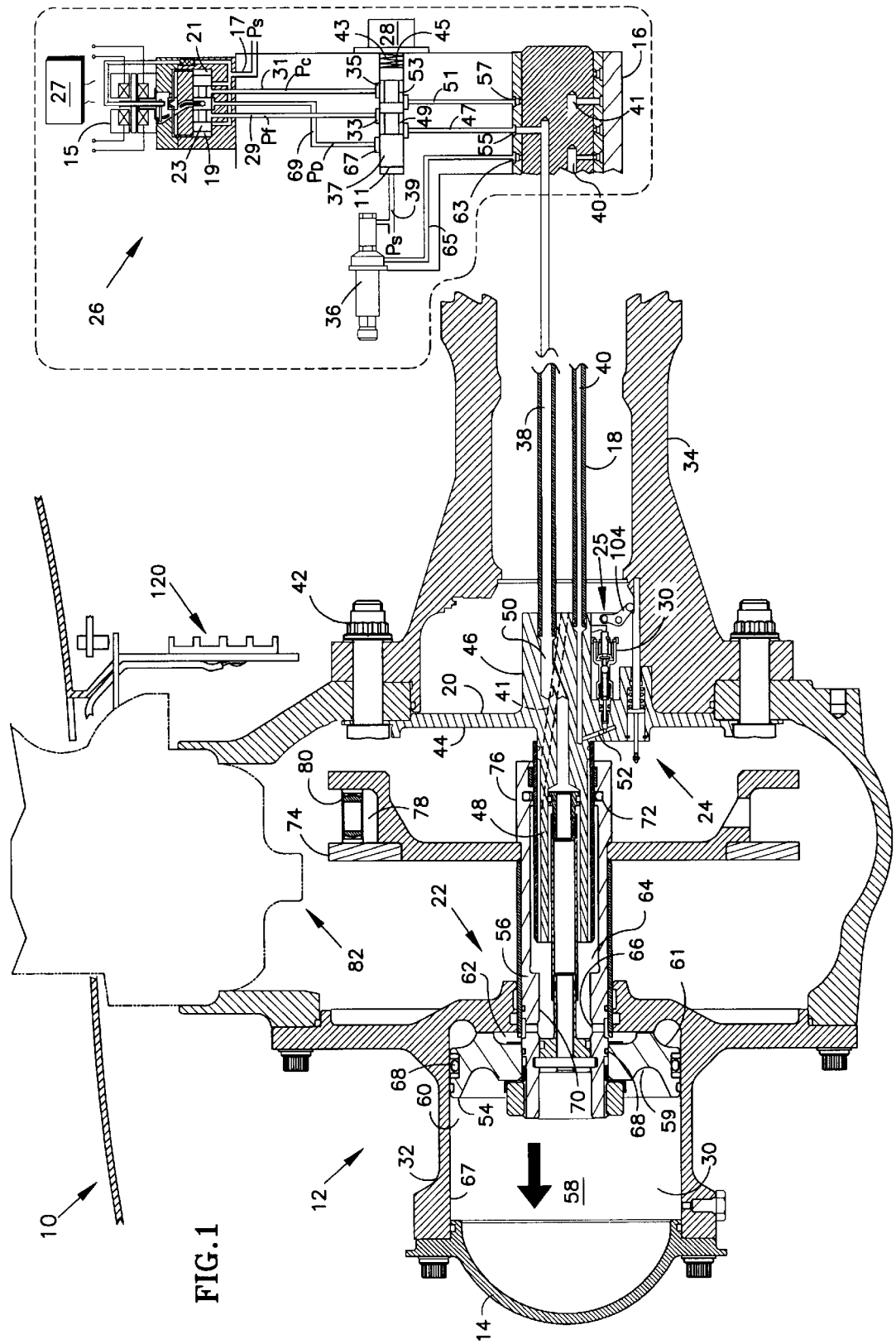
FIG. 1 is a schematic view of the propeller pitch change mechanism of the present invention for use with counterweighted propeller blades.

Referring now to the drawings in detail, there is shown in FIG. 1 a schematic representation of the counterweighted propeller control system of the present invention, designated generally as 10. System 10 generally includes a rotatable portion 12 including a propeller hub 14, a transfer bearing 16, transfer tube 18, and manifold 20 for carrying hydraulic fluid to pitch change actuation mechanism 22, and a low pitch stop and overspeed protection system 24. On a non-rotatable portion 26, an electronic engine control (EEC) 27 communicates with electrohydraulic valve (EHV) 23 and a protection valve 28 for properly distributing hydraulic fluid to transfer bearing 16.

Propeller hub 14 generally defines an internal volume 30 which houses the elements of the rotatable portion 12 with the exception of transfer bearing 16 and a portion of transfer tube 18. Hub 14 includes a fwd portion 32 and an aft portion 34, the functional aspects of which will be discussed below.

Transfer bearing 16 interfaces the rotatable portion 12 with the non-rotatable portion, or control portion 26. That is, transfer bearing 16 is rotatable with rotatable portion 12 and includes a plurality of ports operative to receive hydraulic fluid flow from protection valve 28 in the manner commanded by EEC 27. That is, various hydraulic fluid sources flow into transfer bearing 16 from protection valve 28 as follows.

EHV 23 includes a dual torque motor 15 responsive to signals received from EEC 27 for selectively porting high pressure hydraulic fluid Ps, received on line 17, to first end 19 or second end 21 of spool 23 for positioning thereof. The position of spool 23 couples Ps to either to decrease propeller pitch (Pf) line 29 or increase propeller pitch (Pc) line 31.

Pf line 29 is connected to a first port 33 of protection valve 28 and PC line 31 is connected to a second port 35 of protection valve 28. Protection valve 28 further contains a spool 37. Spool 37 is positioned by the pressure in line 39, which is normally set to high pressure Ps, acting on a first end 11, and spring 43 acting on a second end 45. In this normal position Pf line 29 is place in fluid communication with Pf line 47 via window 49 and Pc line 31 is placed in fluid communication with Pc line 51 via window 53.

Pf line 47 is fluidically connected to port 55 of transfer bearing 16 and Pc line 51 is fluidically connected to port 57 of transfer bearing 16. The transfer tube 18 extends out of transfer bearing 16, and is also rotatable with rotatable portion 12, but is non-translatable, a specific advantage of the present invention.

Transfer tube 18 includes a first channel 38 in fluid communication with port 55 for carrying hydraulic fluid $P_f$ to the actuating mechanism 22 and a second channel 41 (shown on transfer bearing 16, but not shown on transfer tube 18) in fluid communication with port 57 for carrying hydraulic fluid $P_c$ to the actuating mechanism 22.

As indicated, transfer tube 18 is axially non-translating and is only rotatable with rotational portion 12. In this manner, the connection between the transfer tube 18 and transfer bearing 16 is also non-translatable, therefore not requiring integrated bearing surfaces on these parts. This has the advantage of preventing damage to such bearing surfaces as occurs in the prior art therefore preventing subsequent leaking and possible failure of the system. Transfer tube 18 extends into a manifold 20 which is connected via fasteners 42 to propeller hub 14, as shown.

Figure 2:
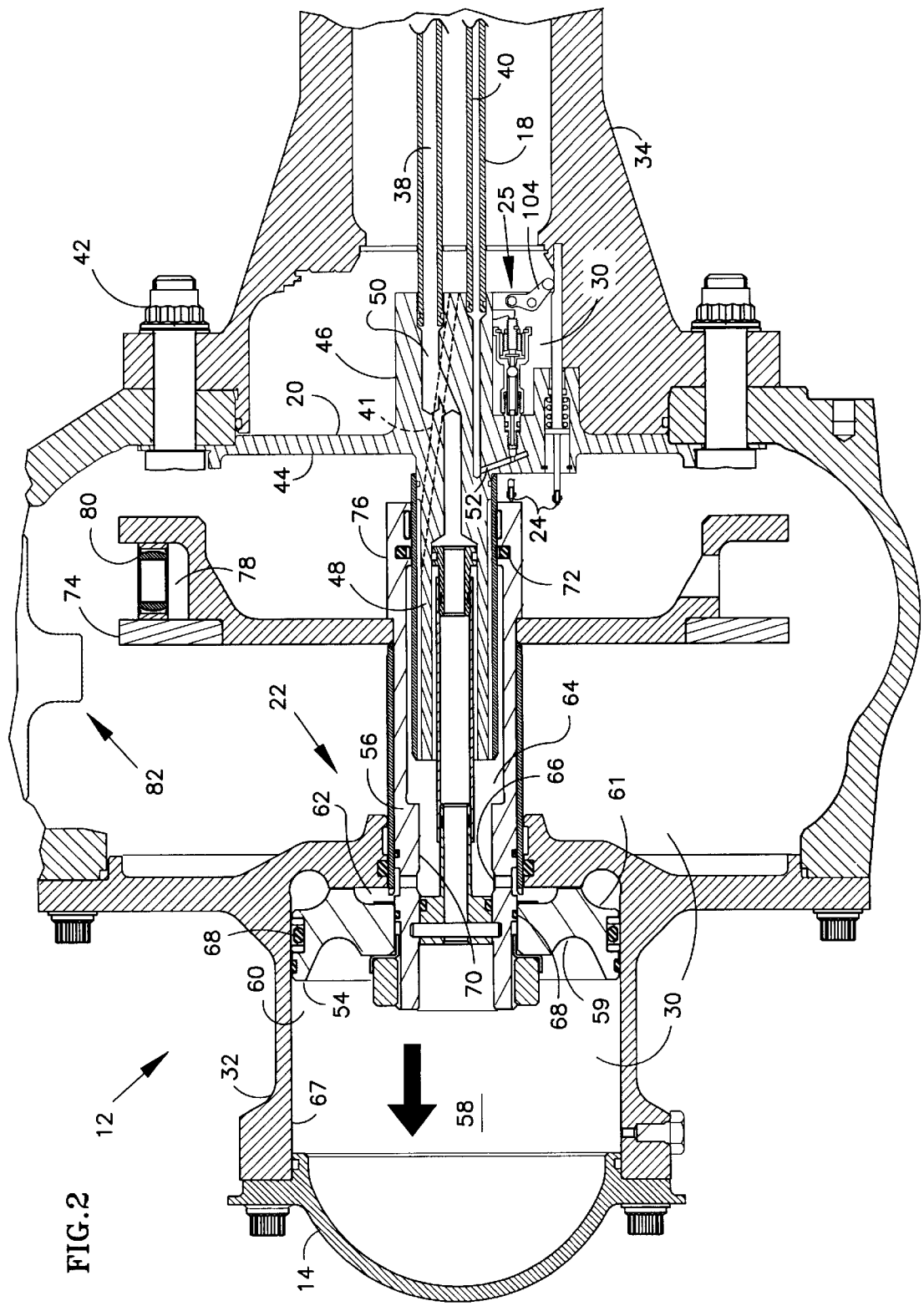
FIG. 2 is an enlarged view of the rotatable portion of the pitch change mechanism of FIG. 1.

Manifold 20, also shown in FIG. 2, is substantially T-shaped in cross section, and includes a circular, disk-shaped portion 44 for fastening to propeller hub 14, a rearwardly extending protrusion 46 for receiving transfer tube 18, and an fwd extending cylindrically shaped portion 48 for slideably connecting with a portion of the pitch change actuation mechanism 22. As shown, transfer tube 18 extends open ended into manifold 20, and first channel 38 thereof is fluidically connected with machined passage 50. Passage 50 extends from first channel 38 into chamber 58 on a first side 59 of pitch change actuation mechanism 22. Second channel 41 is fluidically connected to interior portion 64. Accordingly, hydraulic fluid is delivered from transfer tube 18 through manifold 20, to each side of the pitch change actuation mechanism 22.

Pitch change actuation mechanism 22, also shown in FIG. 2, is comprised of a piston 54 arranged in the fwd portion 32 of hub 14 and a rear support 56 connected with piston 54 and extending from the fwd portion 32 to the rear portion 34 and into slideable relation with forwardly extending protrusion 48 of manifold 20. Piston 54 works in conjunction with the fwd portion 32 of hub 14, forms a chamber 58 for receiving hydraulic fluid from non-rotatable control portion 26 for moving piston 54, for changing the pitch of the blades. Accordingly, within chamber 58 is defined a low pitch side 60 and a high pitch side 62. In order to increase the pitch of the propeller blades, hydraulic fluid $P_c$ is directed to the high pitch side 62 of chamber 58 to move the piston 54 in the increase pitch direction, as indicated by the left pointing arrow. In this scenario, hydraulic fluid $P_c$ is directed through channel 41 of transfer tube 18 through manifold 20, into the interior portion 64 of rear support 56 and subsequently through ports 66 into the high pitch side 62 of chamber 58. Oppositely, to decrease pitch, hydraulic fluid $P_f$ is directed through transfer tube 18 through channel 38 thereof, through passage 50 and further into the low pitch side 60 of chamber 58, as shown in FIG. 1. To prevent leakage between the low pitch side 60 and high pitch side 62, piston 54 is sealed with respect to rear support 56 and wall 67 of hub 14, in chamber 58, via the use of a plurality of seals 68.

As indicated above, rear support 56 includes an interior portion 64 defined by an interior wall 70 which is adapted to receive hydraulic fluid $P_c$ for increasing pitch of the propeller blades. Rear support 56 is slideably connected to fwd extending portion 48 of manifold 20 so that as piston 54 is forced to move in the increase and decrease pitch directions, rear support 56 translates relative to aftly extending portion 48 while maintaining contact and a sealing arrangement with the same. The sealing arrangement is assured via the use of glide rings and seals 72 which provide a seal and allow relative translatory motion between the rear support 56 and forwardly extending protrusion 48. At all times, a portion of interior wall 70 remains in contact via one of the glide rings and seals with the aft extending portion 48 of manifold 20. To facilitate the actual pitch change of the propeller blades, a yoke assembly 74 is connected to the outer surface 76 of rear support 56. Yoke assembly 74 includes grooves 78 for engaging a cam 80 of retention mechanism 82 of the propeller blade. With the translatory motion provided to yoke 74 via the movement of piston 54, cam 80 moves in groove 78 and thereby functions to convert the translatory motion of the pitch change actuation mechanism 22 into rotational motion of the propeller blades.

Figure 3:
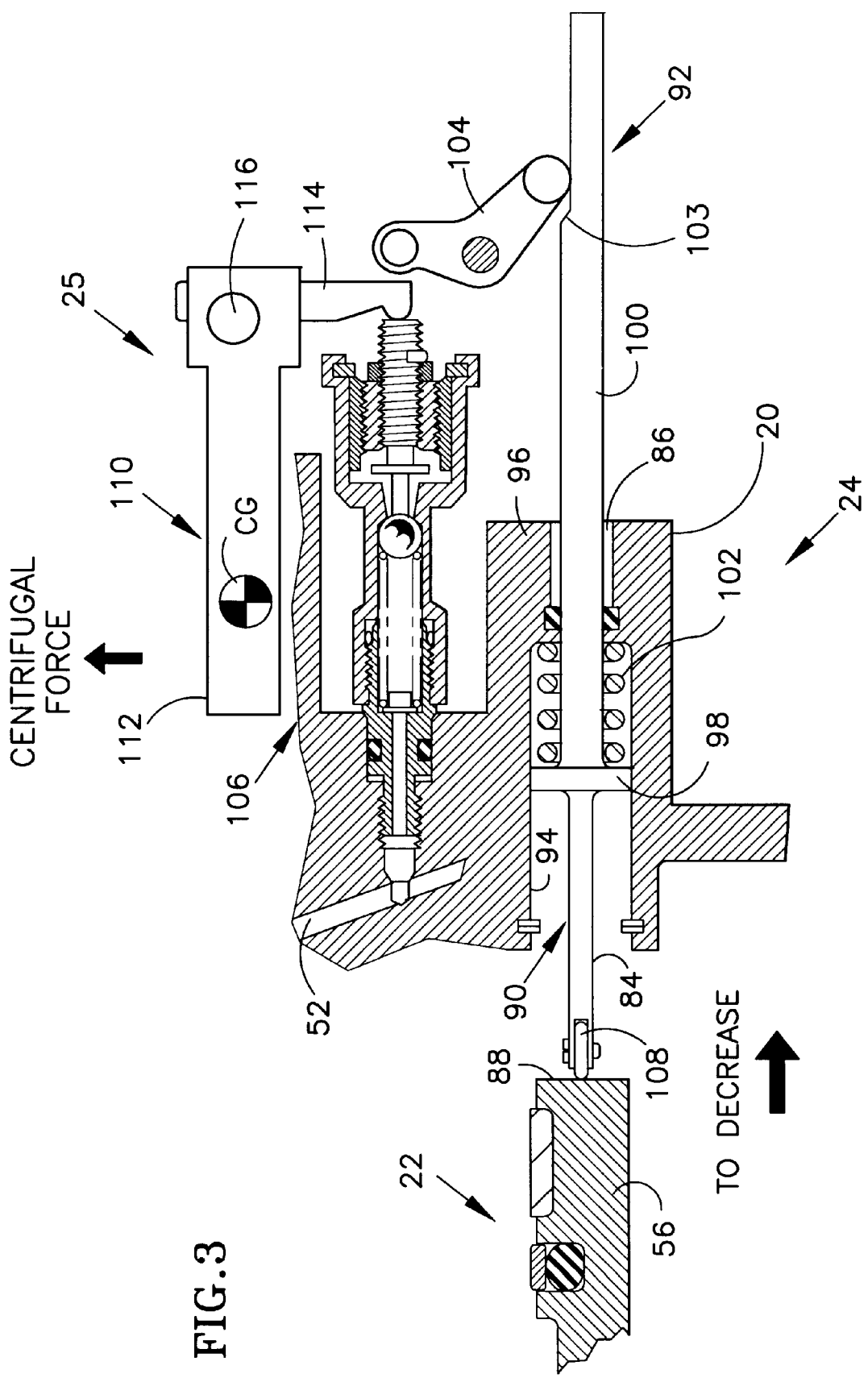
FIG. 3 is a detailed view of circled area 2A of FIG. 2, showing the mechanical secondary low pitch stop and overspeed governor of the present invention.
Figure 4:
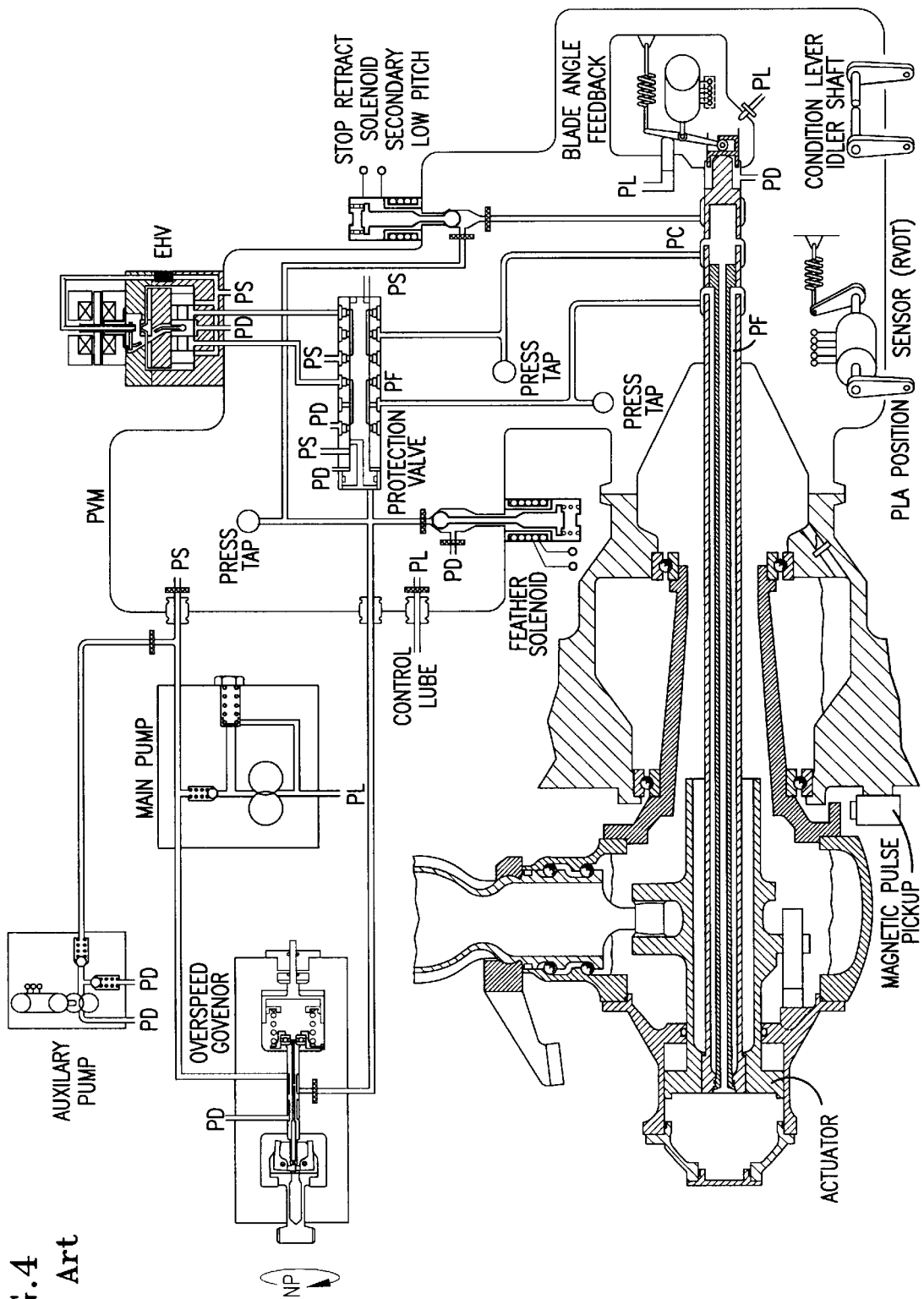
FIG. 4 is a schematic view of a prior art propeller pitch change assembly for use with counterweighted propeller blades.

Since in the system as described above the transfer tubes 18 are non-translating, the transfer tubes 18 cannot and are not used as a means for measuring propeller blade angle for use in enforcing a minimum blade angle excursion. Accordingly, a mechanical secondary low pitch stop 24 is provided on the rotatable portion 12 of system 10, and specifically within manifold 20, as shown. A mechanical overspeed protection assembly 25 is also preferably provided in the same area of low pitch stop mechanism 24 as shown in FIG. 3, and in a preferred embodiment of the present invention, the low pitch stop mechanism 24 and overspeed protection assembly 25 share a common valve 106 for achieving their functions. However, these functions can further be provided using two separate valves. Further detail of the secondary low pitch stop mechanism 24 and overspeed protection assembly 25 is shown in FIG. 2.

Referring now to FIGS. 2 and 3, secondary low pitch stop 24 includes a follow along plunger cam 84 which is translatable in a groove 86 of manifold 20, and which is in contact with the pitch change actuator mechanism 22, and specifically, the rear end 88 of rear support 56. Follow-along plunger 84 includes a sensing portion 90 and an actuating portion 92, wherein the sensing portion 90 is moveable within a larger portion 94 of groove 86 and actuating portion 92 is moveable within a smaller elongated portion 96 of groove 86. Sensing portion 90 includes a flange 98 circumferential to main body 100 of plunger cam 84, wherein flange 98 slides adjacent the large portion 94 of groove 86. A spring 102 is positioned behind flange 98 for providing resistance to the translation of the plunger cam so as to return the same to a starting position. Actuating portion 92 includes a step 103 in the main body 100 of the plunger cam. The step 103 is adapted to engage a pivotable lever 104 which, when rotated, is functional to open a valve 106, preferably a poppet valve. However, other valve types, such as a spool valve, may be used. The fwd tip 108 of plunger cam 84 is in contact with the rear end 88 of rear support 56 for a portion of the stroke of piston 54. When the position of piston 54 is indicative of the blades moving toward the minimum desired low pitch angle, as indicated by the arrow, rear end 88 of rear support 56 becomes engaged with the fwd tip 108 of plunger cam 84 and accordingly, as the actuator is further moved in the decrease pitch direction, plunger cam 84 is translated in the same direction and the step 103 catches an end of lever 104. Further translatory motion of plunger cam 84 causes lever 104 to actuate valve 106 and open the same. The opening of valve 106 connects passage 52 and channel 40 to drain pressure. Channel 40 is in turn fluidically connected to port 63 of transfer bearing 16. Port 63 is in fluid communication with secondary low pitch solenoid 36 via line 65. Low pitch solenoid 36 is normally open placing first end 41 of protection valve 28 in fluid communication with drain pressure. The spring 43 acting on second end 45 translates spool 37 to the left thus connecting ports 33 and 67 via window 49. This in turn drains hydraulic fluid from the low pitch side 60 of chamber 58 via drilled passage 50, first channel 38, line 47 and line 69. Accordingly, piston 54 will translate left increasing blade angle. Blade angle will continue to increase until valve 106 closes due to the motion of rear support 56 moving away from fwd tip 108 of plunger cam 84. With valve 106 closed Ps is again supplied to first end 41 of spool 37 of the protection valve which places Pf of 29 back in fluid communication with low pitch side 60 of chamber 58.

In addition to the secondary low pitch stop assembly 24, an overspeed protection assembly 25 may also be provided in the same vicinity of manifold 20. The overspeed protection assembly 25 may use the same valve 106 for accomplishing its function or it may use a separate valve. In the following embodiment, the overspeed protection assembly 25 uses the same valve 106 as used by the low pitch stop assembly 24.

Accordingly, the overspeed protection assembly 25 comprises a centrifugal flyweight assembly 110 positioned adjacent poppet valve 106, on manifold 20 on the rotatable portion 12 of hub 14. Centrifugal flyweight assembly 110 includes a centrifugal bar 112 mounted at substantially a right angle to a lever 114, wherein the bar and lever are pivotable on a pin 116. The center of gravity of centrifugal bar 112 is indicated by CG. As the speed of the propeller system approaches overspeed as predetermined in the propeller design, the centrifugal force associated with this speed pushes the centrifugal bar in the direction of the arrow labeled Centrifugal Force as shown in FIG. 3. At overspeed, the centrifugal force provides a sufficient moment arm for rotating lever 114 on pin 116 and forcefully against poppet valve 106 for opening the same. Valve 106 controls the hydraulic fluid to low pitch side 60 in the same manner as for low pitch angle operation previously described.

To defeat both the overspeed protection assembly and low pitch stop assembly when reverse blade angles are desired, secondary low pitch solenoid 36 is energized isolating first end 41 of spool 37 of protection valve 28 from line 65. This prevents the actuation valve 106 from effecting the position of protection valve 28 thus prevents the draining of hydraulic fluid from low pitch side 60 of pitch change actuation mechanism 22.

As indicated above, the low pitch stop assembly 24 and overspeed protection assembly 25 can be used as a combined unit or each can be used separately with a poppet valve 106 similar to as described above.

Since the transfer tubes 18 are non-translating as described in detail above, the transfer tubes cannot be used for determining blade angle or acquiring blade angle feedback for a determination of blade angle by a blade angle mechanism. Accordingly, with this invention, a separate and distinct blade angle feedback mechanism is used. Preferably, blade angle is determined from directly measuring the position of the propeller blades via a mechanism 120, as shown in FIG. 1, and most preferably, as provided in U.S.

patent application Ser. No. 08/814,711 assigned to the assignee of the present invention, and shown schematically in FIG. 1.

In operation and referring to FIGS. 1–3, EEC 27 either receives signals from a pilot to change blade angle for increasing or decreasing propeller speed and/or automatically adjusts the blade angle of the propellers to maintain a set speed. Accordingly, EEC communicates with EHV 23, to port hydraulic fluid through protection valve 28 to the pitch change actuation mechanism 22 for changing the blade angles of the propeller blades. To accomplish blade angle changes, pressurized hydraulic fluid $P_f$ is ported to the low pitch side 60 of chamber 58 of pitch actuation mechanism 22 to move the propeller blades towards low pitch or hydraulic fluid $P_c$ is ported to the high pitch side 62 of chamber 58 to move the blades towards high pitch. During operation of the propeller system, and since advantageously transfer tubes 18 do not translate relative to transfer bearing 16 or with pitch change actuation mechanism 22, low pitch excursion and overspeed protection are accomplished exclusive of the transfer tubes. Accordingly, as $P_f$ is ported to the low pitch side 60 of chamber 58 to decrease the pitch of the propeller blades for increasing speed, low pitch stop assembly 24 in effect monitors the pitch change. That is, the fwd tip 108 of the follow along plunger cam 84 is in contact with the rear end 88 of rear support 56 for a portion of its translatory motion. As the blades move towards low pitch and the rear support 56 is positioned accordingly, the fwd tip 108 is in contact with the rear support. The plunger cam is translated in the larger portion 94 of groove 86 in manifold 20 as the blades are moved towards low pitch. When step 103 is caused to engage lever 104, the minimum low pitch blade angle has been reached and lever 104 opens poppet valve 106, causing spool 37 of protection valve 28 to shift commanding the pitch change actuation mechanism 22 to move the blades towards higher pitch. Accordingly, protection valve 28 ports pressurized hydraulic fluid $P_c$ to the increase pitch side 62 of chamber 58 while draining $P_f$ from the low pitch side 60 of chamber 58. Excursion of the blades beyond the minimum low pitch blade angle is thereby prevented.

In a similar manner, overspeed of the propeller blades is prevented via the use of overspeed protection assembly 25 shown in FIG. 3. That is, and typically in the case where the blades are at some level of low pitch, centrifugal fly weight assembly 110 senses an overspeed of the propeller blades and takes action to correct the same. Centrifugal bar 112 of assembly 110 senses the centrifugal force associated with an overspeed situation and as a result, pivots on pin 116 with sufficient force to move lever 114 into contact with poppet valve 106 for opening the same and again causing spool 37 of protection valve 28 to shift. In this manner the same operative steps associated with the shifting of spool 37 from the low pitch stop assembly are carried out.

During the operation as described above, and since the transfer tubes 18 do not translate and cannot be used to determine blade angle, a direct blade angle measuring mechanism 120 is preferably used, as indicated schematically in FIG. 1.

The primary advantage of this invention is that an improved and simplified propeller blade pitch control mechanism is provided for use with counterweighted propeller blades. Another advantage of this invention is that an improved propeller blade pitch actuation assembly is provided which includes the use of non-translating, transfer tubes and a blade angle feedback mechanism which is separate and distinct from the translating tubes. And still another advantage of this invention is that an improved propeller blade pitch change mechanism is provided which incorporates the use of a purely mechanical secondary low pitch stop mechanism located on the rotating portion of the propeller assembly. And yet another advantage of this invention is that an improved propeller pitch change and actuation assembly is provided including a purely mechanical overspeed governor positioned on the rotating portion of the propeller assembly, and which works in conjunction with the actuation mechanism. Still another advantage of this invention is that an improved propeller pitch change and actuation assembly is provided having mechanical overspeed governor and secondary low pitch stop mechanisms which work in conjunction with a shared valve and the actuator mechanism for preventing low pitch excursions beyond a minimum setting and for preventing blade overspeed.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A propeller blade pitch control system for a propeller having a non-rotatable portion and a rotatable portion while in operation, comprising:

a transfer tube, wherein said transfer tube defines an element of said rotatable portion and wherein said transfer tube is axially non-translating relative said rotatable and non-rotatable portions;

means for providing hydraulic fluid to and interfacing with said transfer tube, wherein said means for providing is located on said non-rotatable portion;

means for changing the pitch of said propeller blade;

means for actuating said means for changing, wherein said means for actuating is fluidically connected to and axially translatable relative to said transfer tube; and means for measuring blade angle of said propeller blade, wherein said means for measuring is separate and distinct from said transfer tube.

2. The control system according to claim 1, further comprising means for preventing overspeed, wherein said means for preventing is rotatable as a part of said rotatable portion.

3. The control system according to claim 2, further comprising means for signaling said means for actuating, wherein said means for preventing comprises a valve, wherein upon an indication by said means for preventing, said means for signaling opens said valve to cause said means for actuating to prevent said blades from moving toward lower pitch.

4. The control system according to claim 3, wherein said means for preventing comprises a mechanical centrifugal flyweight including means to actuate said valve upon reaching a preselected centrifugal load at a preselected speed.

5. The control system according to claim 1, further comprising a manifold located between said transfer tube and said means for actuating, wherein said transfer tube and said means for actuating are fluidically connected to and interfaced by said manifold.

6. The control system according to claim 5, wherein said manifold includes means for slidably interfacing with said means for actuating as said means for actuating translates relative said manifold and said transfer tube.

7. The control system according to claim 6, wherein said means for actuating comprises a support and said means for slidably interfacing comprises an extended member, wherein said support is slideable and fluidically sealed relative said member.

8. The control system according to claim 5, wherein said transfer tube comprises at least three fluid passages extending into said manifold, wherein at least two of said at least three fluid passages provides fluid to said means for actuating.

9. The control system according to claim 5, further including means for setting a minimum angle of said blade separate and distinct from said transfer tube.

10. The control system according to claim 9, wherein said means for setting is positioned in said manifold.

11. The control system according to claim 9, wherein said means for setting comprises a cam assembly and a valve assembly and wherein said means for actuating comprises a piston with a low pitch actuation side and a high pitch actuation side, wherein said cam assembly is operative to open said valve assembly at a preset minimum blade angle independent of said transfer tube for preventing said blade from going below said minimum blade angle by porting a fluid to said high pitch actuation side and draining said fluid from said low pitch actuation side.

12. The control system according to claim 11, further including means for defeating said cam assembly and said valve assembly.

13. The control system according to claim 11, wherein said cam assembly is in contact with said means for actuating, said cam assembly including means for detecting said preset minimum blade angle from the position of said means for actuating, wherein upon detecting said preset angle said cam assembly opens said valve assembly.

14. The cam assembly according to claim 13, further including a lever positioned between said cam assembly and said valve assembly, wherein said lever is movable into simultaneous contact with each of said cam assembly and said valve assembly, wherein upon detecting said preset minimum blade angle said cam moves said lever into contact with said valve assembly for opening said valve assembly and preventing further excursion of the blade toward low pitch.

15. The control system according to claim 5, further comprising means for preventing overspeed, wherein said means for preventing is rotatable as a part of said rotatable portion.

16. The control system according to claim 15, further including means for setting a minimum angle of said blade separate and distinct from said transfer tube.

17. The control system according to claim 16, further comprising means for signaling said actuator, wherein said means for setting and said means for preventing comprise a shared valve, wherein upon an indication by said means for preventing, said means for signaling opens said valve to cause said means for actuating to prevent said blades from moving toward lower pitch and wherein upon an indication by said means for setting, said means for signaling opens said valve to cause said means for actuating to prevent said blade angle of said blade from moving toward a lower pitch.

18. The control system according to claim 17, wherein said means for preventing comprises a mechanical centrifugal flyweight including means to actuate said valve upon reaching a preselected centrifugal load at a preselected speed.

19. A propeller blade pitch control system for a propeller having a non-rotatable portion and a rotatable portion while in operation, comprising:

means for changing blade angle of said propeller blade;

means for actuating said means for changing;

means for transferring fluid to said means for actuating, wherein said means for actuating is fluidically connected to and axially translatable relative to said means for transferring;

means for providing hydraulic fluid to and interfacing with said means for transferring, wherein said means for providing is located on said non-rotatable portion;

means for measuring the blade angle of said propeller blade; and means for setting a minimum inflight propeller blade angle, wherein said means for setting is separate and distinct from said means for transferring and said means for measuring and is part of said rotatable portion.

20. The control system according to claim 19, further comprising a manifold located between said means for transferring and said means for actuating and rotatable as part of said rotatable portion, wherein said means for transferring and said means for actuating are fluidically connected to and interfaced by said manifold.

21. The control system according to claim 20, wherein said means for setting is positioned in said manifold.

22. The control system according to claim 21, wherein said means for setting comprises a cam assembly and a valve assembly and wherein said means for actuating comprises a piston with a low pitch actuation side and a high pitch actuation side, wherein said cam assembly is operative to cause said valve assembly to open at a preset minimum blade angle independent of said means for transferring for maintaining said blade at said minimum inflight blade angle by signaling draining of a fluid from said high pitch actuation side.

23. The control system according to claim 22, further including means for defeating said cam assembly and said valve assembly.

24. The control system according to claim 23, wherein said cam assembly is in contact with said means for actuating, said cam assembly including means for detecting said preset minimum blade angle from the position of said means for actuating, wherein upon detecting said preset angle said cam assembly opens said valve assembly and said piston moves toward high pitch.

25. The control system according to claim 24, further comprising a lever positioned between said cam assembly and said valve assembly, wherein said lever is movable into simultaneous contact with each of said cam assembly and said valve assembly, wherein upon detecting said preset minimum blade angle said cam assembly moves said lever into contact with said valve assembly for opening said valve assembly and draining said fluid from said high pitch side of said means for actuating.

26. The control system according to claim 19, further comprising means for preventing overspeed, wherein said means for preventing is rotatable as a part of said rotatable portion.

27. The control system according to claim 26, further comprising means for signaling said actuator, wherein said means for setting and said means for preventing comprise a shared valve, wherein upon an indication by said means for preventing, said means for signaling opens said valve to cause said means for actuating to prevent said blades from moving toward lower pitch and wherein upon an indication by said means for setting, said opens said valve to cause said means for actuating to prevent said blade angle of said blade from moving toward a lower pitch.

28. The control system according to claim 27, wherein said means for preventing comprises a mechanical centrifugal flyweight including means to actuate said valve upon reaching a preselected centrifugal load at a preselected speed.

29. The control system according to claim 27, wherein said means for setting comprises a cam adapted to be connected with said means for actuating for detecting position of said means for actuating, wherein said cam includes means for activating said valve at a threshold position indicative of a minimum inflight blade angle.

* * * * *